(12) United States Patent
Muralidhar et al.

(10) Patent No.: US 10,981,558 B2
(45) Date of Patent: Apr. 20, 2021

(54) ENGINE START/STOP CONTROL SYSTEM AND METHOD

(71) Applicant: Cummins Inc., Columbus, IN (US)

(72) Inventors: Praveen C. Muralidhar, Ann Arbor, MI (US); Martin T. Books, Columbus, IN (US); Jennifer K. Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/527,971

(22) Filed: Jul. 31, 2019

(65) Prior Publication Data

US 2019/0381992 A1 Dec. 19, 2019

Related U.S. Application Data

(62) Division of application No. 15/240,585, filed on Aug. 18, 2016, now Pat. No. 10,414,391.

(Continued)

(51) Int. Cl.
*B60L 9/00* (2019.01)
*G05D 1/00* (2006.01)
(Continued)

(52) U.S. Cl.
CPC ............ *B60W 20/12* (2016.01); *B60W 10/06* (2013.01); *B60W 10/08* (2013.01); *B60W 10/24* (2013.01);
(Continued)

(58) Field of Classification Search
CPC ...... B60W 10/06; B60W 10/08; B60W 10/24; B60W 2050/0039; B60W 20/12; B60W 2300/12; B60W 2510/0676; B60W 2510/244; B60W 2555/20; B60W 2710/244; B60Y 2200/92; F02N 11/0822;
(Continued)

(56) References Cited

U.S. PATENT DOCUMENTS 5,285,963 A * 2/1994 Wakefield ............ B60H 1/0025
123/142.5 R
5,385,126 A * 1/1995 Matthews ............... F02N 19/04
123/179.21

(Continued)

FOREIGN PATENT DOCUMENTS

JP 2010-214991 A 9/2010
WO 20071061409 A2 5/2007

*Primary Examiner* — Harry Y Oh
(74) *Attorney, Agent, or Firm* — Faegre Drinker Biddle & Reath LLP

(57) ABSTRACT

The present disclosure provides an engine stop/start control system for a vehicle comprising a first engine restart module configured to set a restart frequency and duration of an engine in response to a sensed ambient temperature, a second engine restart module configured to control the engine in response to a sensed characteristic temperature associated with the engine, a third engine restart module configured to control the engine in response to occurrence or non-occurrence of at least one expected charging event along a predefined route, a fourth engine restart module configured to control the engine in response to a state-of-charge of an energy storage device, and a route optimization module configured to set and adjust a proposed route to a destination that results in reduced engine usage.

18 Claims, 7 Drawing Sheets

Related U.S. Application Data

(60) Provisional application No. 62/207,143, filed on Aug. 19, 2015.

(51) Int. Cl.

| | | |
|---|---|---|
| *G05D 3/00* | (2006.01) | |
| *G06F 7/00* | (2006.01) | |
| *G06F 17/00* | (2019.01) | |
| *B60W 20/12* | (2016.01) | |
| *F02N 11/08* | (2006.01) | |
| *B60W 10/06* | (2006.01) | |
| *B60W 10/08* | (2006.01) | |
| *B60W 10/24* | (2006.01) | |
| *B60W 50/00* | (2006.01) | |

(52) U.S. Cl.
CPC ........ *F02N 11/084* (2013.01); *F02N 11/0822* (2013.01); *F02N 11/0829* (2013.01); *F02N 11/0833* (2013.01); *F02N 11/0837* (2013.01); *B60W 2050/0039* (2013.01); *B60W 2300/12* (2013.01); *B60W 2510/0676* (2013.01); *B60W 2510/244* (2013.01); *B60W 2555/20* (2020.02); *B60W 2710/244* (2013.01); *B60Y 2200/92* (2013.01); *F02N 2200/023* (2013.01); *F02N 2200/061* (2013.01); *F02N 2200/122* (2013.01); *F02N 2200/123* (2013.01); *Y02T 10/40* (2013.01); *Y02T 10/62* (2013.01); *Y10S 903/905* (2013.01)

(58) Field of Classification Search
CPC ............ F02N 11/0829; F02N 11/0833; F02N 11/0837; F02N 11/084; F02N 2200/023; F02N 2200/061; F02N 2200/122; F02N 2200/123; Y02T 10/48; Y02T 10/6286; Y10S 903/905

See application file for complete search history.

(56) References Cited

U.S. PATENT DOCUMENTS

| | | |
|---|---|---|
| 5,865,263 A | 2/1999 | Yamaguchi et al. |
| 7,539,562 B2 | 5/2009 | Maguire et al. |
| 8,140,204 B2 | 3/2012 | Okubo et al. |
| 8,359,133 B2 | 1/2013 | Yu et al. |
| 8,401,733 B2 | 3/2013 | Weslati et al. |
| 8,447,511 B2 | 5/2013 | Frese et al. |
| 8,706,409 B2 | 4/2014 | Mason et al. |
| 8,731,752 B2 | 5/2014 | Yu et al. |
| 8,972,090 B2 | 3/2015 | Weslati et al. |
| 10,414,391 B2 | 9/2019 | Muralidhar et al. |
| 2003/0126907 A1* | 7/2003 | Nagashima ........... F02D 41/185 73/1.71 |
| 2008/0098972 A1* | 5/2008 | Elwart ................... B60L 1/003 123/142.5 E |
| 2010/0176759 A1* | 7/2010 | North ..................... F02M 53/06 318/473 |
| 2011/0166731 A1 | 7/2011 | Kristinsson et al. |
| 2012/0101677 A1 | 4/2012 | Ikegami et al. |
| 2015/0025721 A1 | 1/2015 | Thompson et al. |
| 2015/0122203 A1 | 5/2015 | Ideshio et al. |
| 2015/0159613 A1 | 6/2015 | Jensen et al. |
| 2015/0159615 A1* | 6/2015 | Van Wiemeersch ........................ F02N 11/084 701/113 |
| 2015/0275787 A1 | 10/2015 | Dufford et al. |
| 2016/0347303 A1* | 12/2016 | Murata .................. B60K 6/445 |
| 2017/0067388 A1* | 3/2017 | Murata .................... F01P 7/12 |

* cited by examiner

ENGINE START/STOP CONTROL SYSTEM AND METHOD

RELATED APPLICATIONS

This application is a divisional of U.S. application Ser. No. 15/240,585, filed on Aug. 18, 2016 and claims priority to U.S. Provisional Patent Application Ser. No. 62/207,143, filed Aug. 19, 2015, the disclosures of which are expressly incorporated herein by reference in its entirety.

FIELD OF THE DISCLOSURE

The present invention relates generally to control strategies for operating vehicle engines, and more specifically to start/stop control strategies for hybrid vehicles and route optimization.

BACKGROUND OF THE DISCLOSURE

In hybrid vehicle architectures such as Plug-in Hybrid Vehicles (PHEV), Range Extended Electric Vehicles (REEV), or Series Hybrid Vehicles (SHV), multiple independent sources of energy are available to propel the vehicle. Energy sources include internal combustion ("IC") engines and motor/generators powered by energy storage systems such as high voltage batteries, super capacitors, etc. In all of these architectures, vehicle propulsion can be achieved by using just the stored electric energy to run the motor, or the engine can be used to propel the vehicle (assuming the engine is mechanically coupled to the driveline) and/or to work with a generator to provide propulsion power to the driveline and to replenish the energy storage system. Depending on the drive cycle and battery size, the engine can be shut off and remain stopped for significant portions of the drive cycle. However, this could also pose a challenge, since starting a cold engine requires more energy and subsequently, engine warm-up inefficiencies can consume a significant amount of fuel, thereby reducing the overall fuel economy of the vehicle.

If the driving route does not provide adequate opportunities to replenish the energy storage device through regenerative braking or the occasional charging station, the engine may be restarted to replenish the energy storage device more frequently. However, frequent starting and stopping of the engine can cause undesirable vehicle noise, vibration and harshness, reduced engine hardware life expectancy, etc. Other considerations include municipal ordinances which may limit or constrain engine running. Also, for vehicles used in repetitive routes (e.g., bus routes, etc.), daily variability in route conditions may result in some days where the stored battery charge is sufficient to complete the whole day, and starting the engine prematurely is wasteful. In some applications, the battery may be sized such that it does not provide sufficient power to climb the steepest route grades and the engine must be brought online to provide supplemental electric power. The varying number of times the engine may be started and the varying duration of total engine run time on a given day, combined with the efficiency consequences of engine warm-up in cold environments can produce sub-optimal fuel economy if not managed properly. Hence, an approach is needed to address these issues, while not affecting the ability of the powertrain to meet driver demand.

SUMMARY

According to one embodiment, the present disclosure provides an engine stop/start control system for a vehicle comprising a first engine restart module configured to set a restart frequency and duration of an engine in response to a sensed ambient temperature, a second engine restart module configured to control the engine in response to a sensed characteristic temperature associated with the engine, a third engine restart module configured to control the engine in response to occurrence or non-occurrence of at least one expected charging event along a predefined route, a fourth engine restart module configured to control the engine in response to a state-of-charge of an energy storage device, and a route optimization module configured to set and adjust a proposed route to a destination that results in reduced engine usage.

In another embodiment, the present disclose provides a method of controlling start/stop operation of an engine of a hybrid vehicle, comprising sensing an ambient temperature of an environment of the engine, evaluating, using a controller, a model for the engine using the sensed ambient temperature, and setting a restart frequency and duration of the engine in response to evaluating the model, the restart frequency and duration being set such that the engine is started at a frequency and operated for a duration after each start that avoids excessive cool down of the engine.

In one aspect of the method, sensing the ambient temperature of the environment of the engine comprises receiving a temperature signal from a temperature sensor.

In another aspect of the method, sensing the ambient temperature of the environment of the engine comprises receiving a temperature signal over a communication network from a remote source.

In a further aspect of the method, the method further comprises adjusting the restart frequency and duration of the engine in response to a variation in the ambient temperature.

In another embodiment, the present disclosure provides a method of controlling start/stop operation of an engine of a hybrid vehicle, comprising sensing a characteristic temperature of the engine when the engine is not running, evaluating, using a controller, the characteristic temperature to determine whether the characteristic temperature is below a threshold value, and running the engine in response to the characteristic temperature being below the threshold value.

In one aspect of the method, sensing the characteristic temperature comprises sensing a temperature of engine coolant, engine oil, air at an intake manifold, engine exhaust, or exhaust aftertreatment.

In another aspect of the method, running the engine in response to the characteristic temperature being below the threshold comprises running the engine for a fixed period of time.

In another aspect of the method, running the engine in response to the characteristic temperature being below the threshold comprises running the engine until the characteristic temperature reaches a desired value above the threshold value.

In yet another embodiment, the present disclosure provides a method of controlling start/stop operation of an engine of a hybrid vehicle, comprising obtaining route information including a characteristic of at least one expected charge event, evaluating, using a controller, whether the expected charge event occurred, and running the engine in response to non-occurrence of the expected charge event.

In one aspect of the method, evaluating whether the expected charge event occurred includes evaluating information about a state-of-charge of an energy storage device.

In another aspect of the method, evaluating whether the expected charge event occurred includes evaluating information manually input by a vehicle operator.

In another aspect of the method, evaluating whether the expected charge event occurred includes evaluating information from at least one sensor associated with the hybrid vehicle.

In still another embodiment, the present disclosure provides a method of controlling start/stop operation of an engine of a hybrid vehicle, comprising determining a desired state-of-charge ("SOC") trajectory of an energy storage device used to power a motor of the vehicle over a fixed time period, obtaining, during the fixed time period, an actual SOC value of the energy storage device when the engine is not running, evaluating, using a controller, whether the actual SOC value when the engine is not running is below the desired SOC trajectory, running the engine in response to the actual SOC value being below the desired SOC trajectory, obtaining, during the fixed time period, an actual SOC value of the energy storage device when the engine is running, evaluating, using the controller, whether the actual SOC value when the engine is running is at or above the desired SOC trajectory, and stopping the engine when the actual SOC value when the engine is running is at or above the desired SOC trajectory.

In one aspect of the method, the desired SOC trajectory of the energy storage device ensures that a reserve of useful energy is always present in the energy storage device.

According to another embodiment, the present disclosure provides a method of controlling start/stop operation of an engine of a vehicle, comprising obtaining destination information specifying a destination of the vehicle, obtaining route information for potential routes to the specified destination, evaluating, using a controller, route options in response to the route information to identify potential routes, evaluating, using the controller, the potential routes in response to route constraints, and setting, as a final route, a potential route that satisfies the route constraints.

In one aspect of the method, obtaining route information comprises obtaining at least one of traffic conditions, a number of stop lights and stop signs, and historical data.

In another aspect of the method, the route constraints comprise at least one of a drive time limitation, a requirement to minimize a number of left turns, and a requirement to avoid a certain road.

In a further aspect of the method, the method further comprises obtaining route information for the final route, evaluating, using the controller, whether the route information for the final route indicates a need for reassessment of the final route, and reassessing the route options when the route information for the final route indicates a need for reassessment.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of attaining them will become more apparent and the disclosure itself will be better understood by reference to the following description of embodiments of the present disclosure taken in conjunction with the accompanying drawings, wherein.

Figure 1:
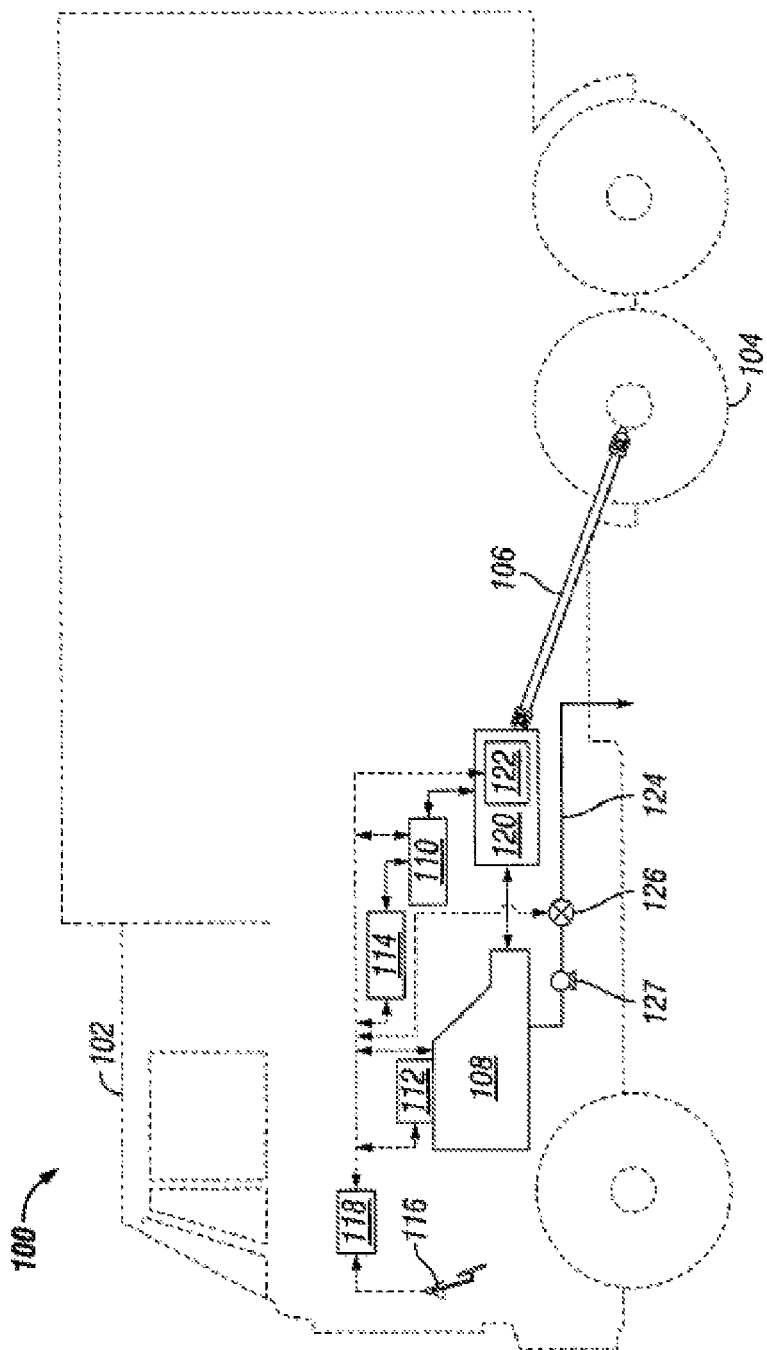
FIG. 1 is a schematic block diagram of a hybrid vehicle system.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

The embodiment disclosed below is not intended to be exhaustive or limit the disclosure to the precise form disclosed in the following detailed description. Rather, the embodiments are chosen and described so that others skilled in the art may utilize its teachings.

Referring to FIG. 1, an exemplary system 100 includes a vehicle 102 that includes cargo carrying capability, although system 100 is not limited to cargo carrying vehicles. System 100 further includes a hybrid power train having an internal combustion engine 108 and an electric device 110 selectively coupled to a drive shaft 106. The engine 108 may be any type of internal combustion engine known in the art. In some applications, the internal combustion engine 108 may be a diesel engine. In the example of FIG. 1, the engine 108 and electric device 110 are coupled to the driveshaft 106 through a transmission 120 having a power splitter (not shown). However, any hybrid configuration known in the art, including at least series, parallel, and series-parallel, is contemplated herein. Furthermore, in various embodiments, system 100 may include a conventional power train equipped with idle start-stop.

The system 100 further includes an electric generator that is selectively coupled to the drive shaft 106 and further coupled to an electrical energy storage device 114. The electric generator in FIG. 1 is included with the electric device 110 as an electric motor/generator. However, the electric generator may be a separate device. Electrical energy storage device 114 is electrically connected to the generator 110 to store electricity generated by the generator 110. The electrical energy storage device 114 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 114 is contemplated herein, including a hyper-capacitor and/or an ultra-capacitor.

In certain embodiments, the system 100 includes the drive shaft 106 mechanically coupling the hybrid power train to a vehicle drive wheel 104. The system 100 may include any type of load other than or in addition to a drive wheel 104, for example any load that includes stored kinetic energy that may intermittently be slowed by any braking device included in the hybrid power train.

An exemplary mechanical braking device includes a compression braking device 112, for example a device that adjusts the valve timing of the engine 108 such that the engine becomes a torque absorber rather than a torque producer. Another exemplary mechanical braking device includes an exhaust throttle 126 (or exhaust brake) that, in moving toward a closed position, partially blocks an exhaust stream 124 and applies back pressure on the engine resulting in a negative crankshaft torque amount. Yet another exemplary mechanical braking device is a variable geometry turbocharger (VGT) 127. Certain VGT 127 devices can be adjusted to produce back pressure on the engine 108 and provide a braking effect. Still another exemplary mechanical braking device includes a hydraulic retarder 122.

The system 100 further includes a deceleration request device 116 that provides a deceleration request value. An exemplary deceleration request device comprises a throttle pedal position sensor. However, any device understood in the art to provide a deceleration request value, or a value that can be correlated to a present negative torque request for the hybrid power train is contemplated herein.

The system 100 further includes a controller 118 having modules structured to functionally execute operations for managing start/stop operation of engine 108. In certain embodiments, the controller 118 forms a portion of a processing subsystem including one or more computing devices having memory, processing, and communication hardware. The controller 118 may be a single device or a distributed device, and the functions of the controller 118 may be performed by hardware or software.

In certain embodiments, the controller 118 includes one or more modules structured to functionally execute the operations of the controller 118. In certain embodiments, the controller 118 may including one or more of a first engine restart module that sets the restart frequency and duration of engine 108 in response to a sensed ambient temperature, a second engine restart module that controls the running of engine 108 in response to a sensed characteristic temperature associated with engine 108, a third engine restart module that controls the running of engine 108 in response to occurrence or non-occurrence of expected charging events along a predefined route, a fourth engine restart module that controls the running of engine 108 in response to a state-of-charge ("SOC") of energy storage device 114, and a route optimization module that sets and adjusts a proposed route to a destination that will result in reduced engine usage.

The description herein including modules emphasizes the structural independence of the aspects of the controller 118, and illustrates one grouping of operations and responsibilities of the controller 118. Other groupings that execute similar overall operations are understood within the scope of the present application. Modules may be implemented in hardware and/or software on computer readable medium, and modules may be distributed across various hardware or software components. Additionally, controller 118 need not include all of the modules discussed above.

Certain operations described herein include evaluating one or more parameters. Evaluating, as utilized herein, includes, but is not limited to, receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
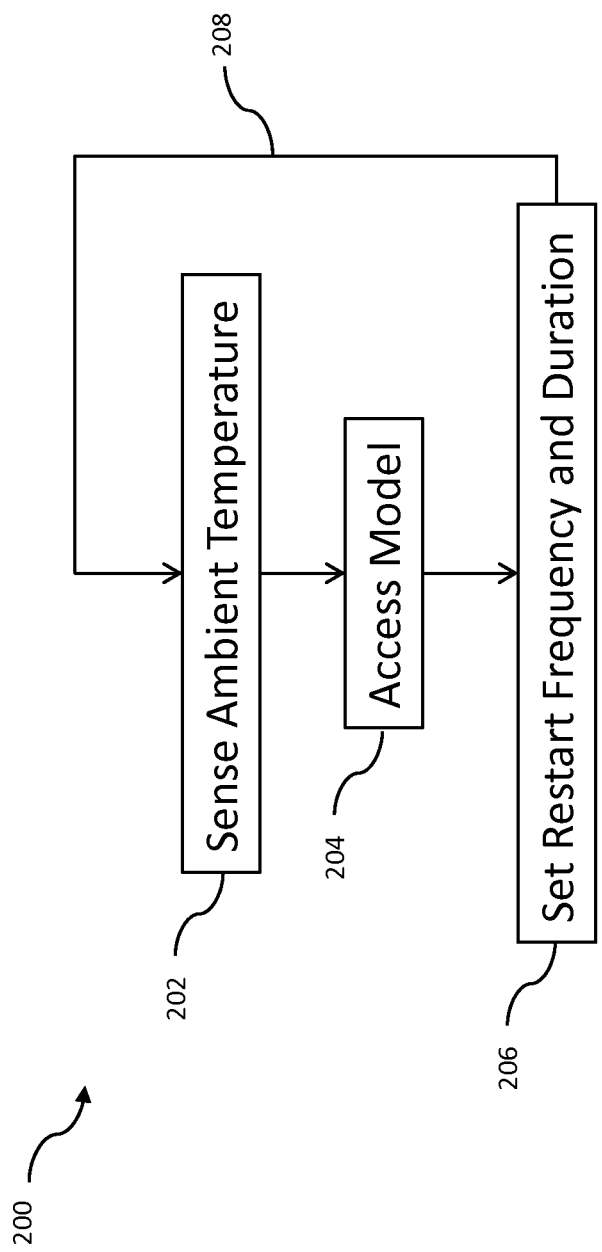
FIG. 2 is flow chart of a first method of controlling start/stop operation of an engine.

Referring now to FIG. 2, a method for controlling the start/stop operation of engine 108 is depicted. Method 200 may be performed by controller 108 executing the first engine restart module that sets the restart frequency and duration in response to a sensed ambient temperature. This embodiment may be particularly applicable to plug-in hybrid vehicles operated in cold environments. With plug-in hybrids, the energy storage device 114 may be substantially or completely charged at the end of a charging event (e.g., after being plugged in overnight). Accordingly, the need to run engine 108 to recharge energy storage device 114 may be reduced compared to other hybrid architectures.

If the engine is rarely started in a cold environment, however, it is possible that all engine running performance will suffer from warm-up inefficiencies. Accordingly, it is desirable to prevent engine 108 from cooling down excessively due to extended stop durations to minimize the inefficiencies of cold restarts during vehicle operation. In method 200 of FIG. 2, engine 108 is restarted at a fixed frequency and run, for example, at the best brake specific fuel consumption ("BSFC"). At step 202, controller 118 evaluates the ambient temperature. In this step, controller 118 may receive temperature indicative information from a temperature sensor (not shown) mounted on the vehicle (such as on the engine block). In other alternatives, controller 108 may receive ambient temperature indicative information over a communication network from a source remote from the vehicle (such as a weather service). Other alternatives are contemplated by this disclosure.

At step 204, controller 118 accesses a model, look up table, algorithm or other data structure to determine how often to restart engine 108 and how long to run engine 108 during each restart to prevent the engine from excessive cool down (i.e., cooling down to a temperature that will result in operational inefficiencies during the next restart). Such a model may be specific to the physical characteristics of engine 108 (e.g., engine size, engine materials, location on vehicle 102, etc.). At step 206, controller 118 sets the restart frequency and duration of engine 108.

By employing method 200, controller 118 may restart engine 108, for example, every hour on a relatively warm day and run engine 108 for fifteen minutes. On a relatively cold day, on the other hand, controller 118 may restart engine 108 every thirty minutes and run engine 108 for fifteen minutes. As indicated by line 208 in FIG. 2, the ambient temperature may be monitored throughout the day and controller 118 may adjust the restart frequency and duration in response to variations in ambient temperature.

Figure 3:
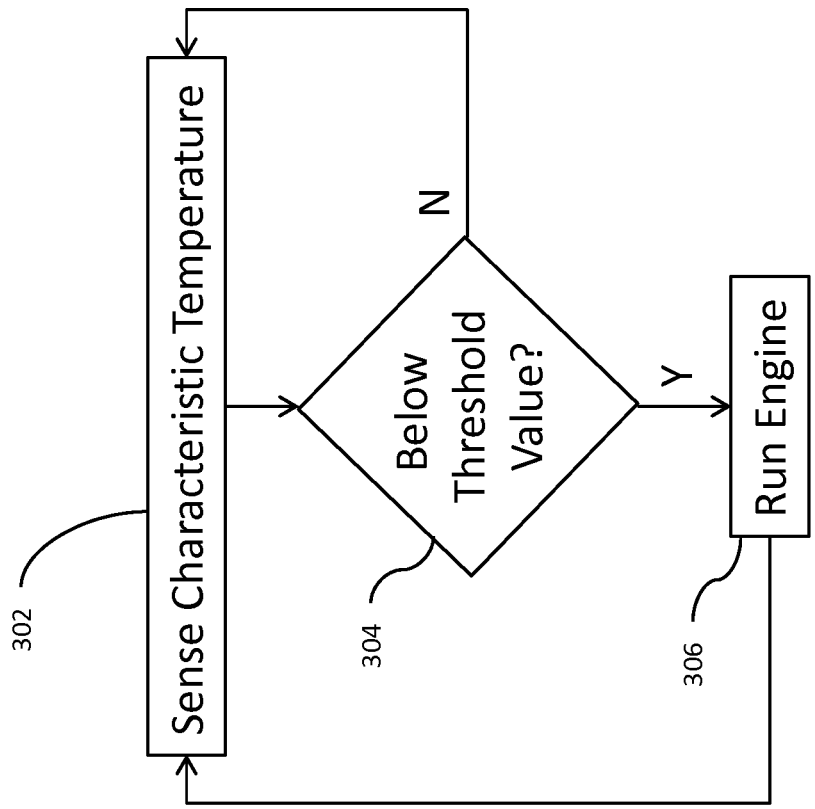
FIG. 3 is a flow chart of a second method of controlling start/stop operation of an engine.

FIG. 3 depicts another method for controlling the start/stop operation of engine 108. Method 300 may be performed by controller 108 executing the second engine restart module that controls the running of engine 108 in response to a sensed characteristic temperature associated with engine 108 during vehicle operation. This embodiment may also be particularly applicable to plug-in hybrid vehicles operated in cold environments. In method 300, a characteristic temperature of engine 108 is sensed at step 302 when the engine is not running during vehicle operation. The characteristic temperature may include the temperature of the engine coolant, the oil, the air at the intake manifold, engine exhaust, exhaust aftertreatment, etc. At step 304, controller 118 evaluates the sensed characteristic temperature by comparing it to a predetermined threshold value. If the characteristic temperature is below the threshold value (or, in other embodiments, within some predefined tolerance of the threshold value), then controller 118 starts engine 108 as indicated by step 306 of method 300. If the characteristic temperature is not below the threshold value, then controller 118 simply continues to evaluate the sensed characteristic temperature.

Controller 118 may run engine 108 at step 306 for a fixed period of time or until the characteristic temperature reaches a desired value above the threshold value. In the latter case, controller 118 evaluates the sensed characteristic temperature during engine operation as compared to the desired value. After the sensed characteristic temperature reaches the desired value (or, in other embodiments, comes within a predefined tolerance of the desired value), controller 118 deactivates engine 108 and thereafter monitors the sensed characteristic temperature as depicted in FIG. 3.

Figure 4:
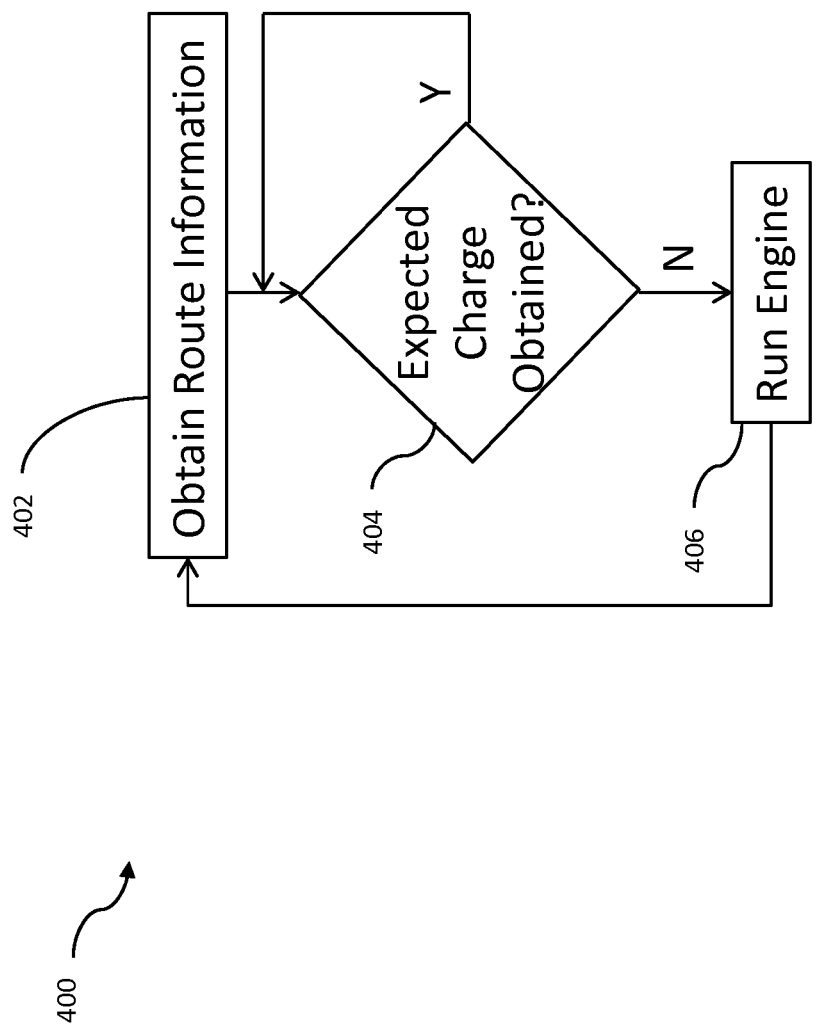
FIG. 4 is a flow chart of a third method of controlling start/stop operation of an engine.

FIG. 4 depicts another method for controlling the start/stop operation of engine 108. Method 400 may be performed by controller 108 executing the third engine restart module that that controls the running of engine 108 in response to the occurrence or non-occurrence of expected charging events along a predefined route. This embodiment may be particularly applicable to hybrid vehicles operated on fixed routes having charging stations along the route. For example, hybrid busses operate on predictable, fixed routes. Along such routes, for example at certain bus stops, charging stations may be provided. While the passengers exit and enter the bus at these stops, the bus may be connected to the charging station and receive a brief charge. Controller 118 may be programmed to operate engine 108 in response to occurrence of the expected charging events along the predetermined route. When an expected charge is not obtained (e.g., because the charging station is down), then controller 118 can operate engine 108 as needed to account for the lack of charge.

At step 402 of method 400, controller 118 obtains route information. This includes obtaining an indication of the number and location of charging stations along the route. It should be understood that step 118 may also include controller 118 obtaining information via GPS, intelligent transportation systems or other sources. Using this information, controller 118 may implement an engine start/stop schedule to operate engine 108 only as needed during the portions of the route that do not include sufficient charging stations. For example, charging stations may be expected at least once per hour in a drive cycle. At step 404 controller 118 determines if an expected charge was obtained. Controller 118 may make this determination by evaluating information about the SOC of energy storage device 114, information inputted manually by the vehicle operator, or information from other sensors associated with vehicle 102. As indicated in FIG. 4, if an expected charge is not obtained, then controller 118 may operate engine 108 (at step 406) to provide an energy boost to accommodate for the missed charge. If the expected charge was obtained, controller 118 continues to monitor for further expected charges along the route.

Figure 5:
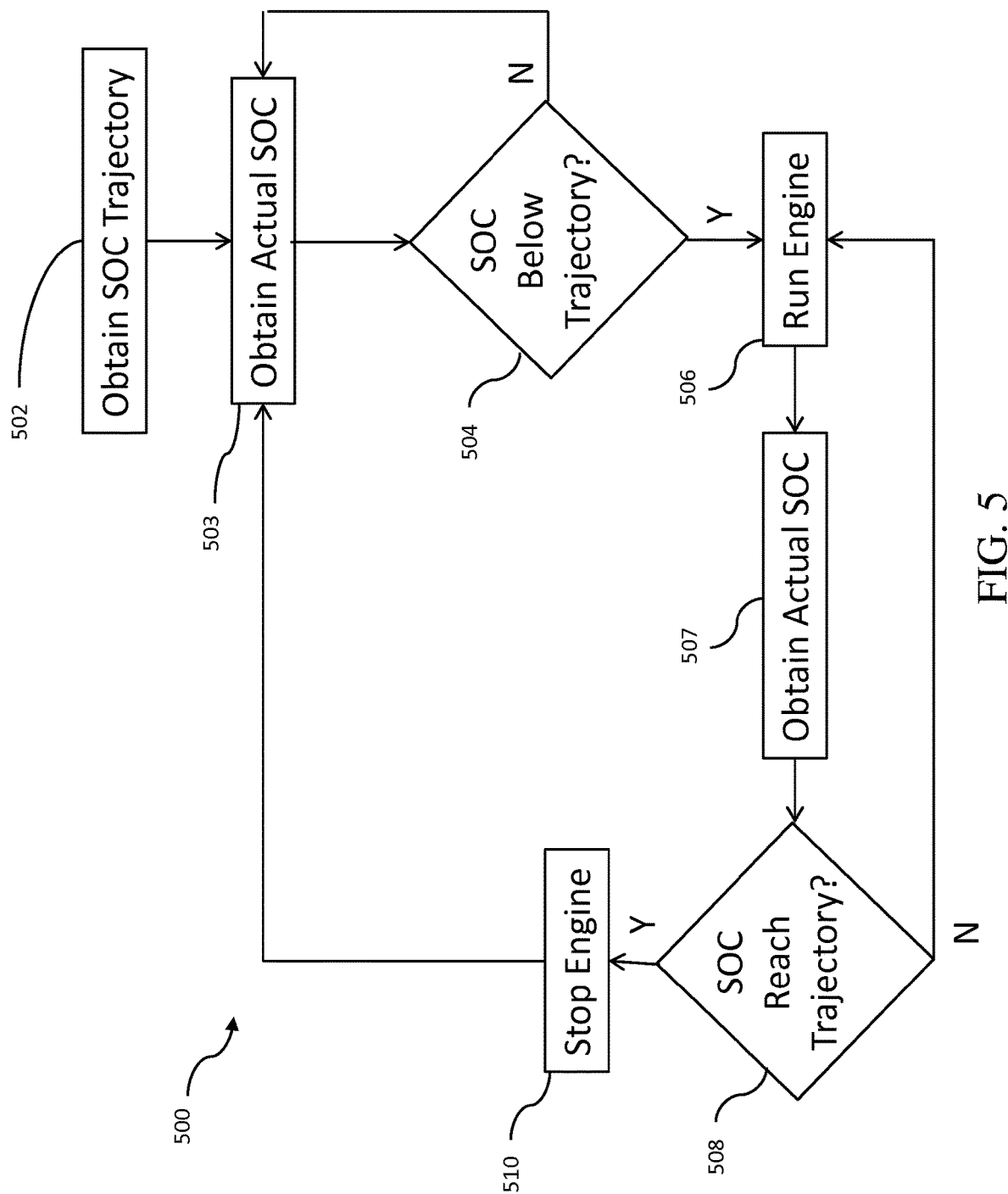
FIG. 5 is a flow chart of a fourth method of controlling start/stop operation of an engine.

In yet another embodiment of controlling engine start/stop operation, FIG. 5 depicts a method 500 performed by controller 108 executing the fourth engine restart module that that controls the running of engine 108 in response to a SOC of energy storage device 114. This embodiment may be particularly applicable to vehicles that operate for a fixed time period, such as a twelve hour driving shift per day. A desired SOC trajectory may be determined (and programmed into controller 118) to pro-rate the usage of energy storage device 114 to achieve a substantially constant rate over the fixed time period, and to achieve substantial depletion of energy from energy storage device 114 at the end of the fixed time period. The actual SOC of energy storage device 114 may be monitored and compared to the desired SOC trajectory over the time period, and engine 108 may be operated only as needed to maintain the desired SOC trajectory.

More specifically, at step 502 of FIG. 5 controller 108 obtains the desired SOC trajectory. At step 503, controller 118 obtains the actual SOC of energy storage device 114 when the engine is not running during vehicle operation. At step 504, controller 118 evaluates the actual SOC as compared to the desired SOC trajectory. If the actual SOC is not below the desired SOC trajectory, then controller 118 continues to monitor the actual SOC (i.e., returns to step 503). If, however, the actual SOC is below the desired SOC trajectory, then controller 118 activates engine 108 at step 506 to generate additional charge for energy storage device 114. At step 507, controller 118 obtains the actual SOC of energy storage device 114 when engine 108 is running, and at step 508 controller 118 evaluates the actual SOC when engine 108 is running as compared to the desired SOC trajectory.

If the actual SOC when engine 108 is running has not reached the desired SOC trajectory (e.g., is at, above, or within a predefined tolerance of the desired SOC trajectory), then controller 118 continues to operate engine 108 and monitor the actual SOC. After the actual SOC when engine 108 is running reaches the desired SOC trajectory, controller 118 stops operation of engine 108 at step 510. Thereafter, method 500 returns to step 503 and controller 118 continues to determine whether the actual SOC is below the desired SOC trajectory. It should be understood that method 500 is intended to encompass approaches wherein engine 108 is started when the actual SOC falls below some tolerance value of the desired SOC trajectory and/or stopped when the actual SOC rises above some tolerance value of the desired SOC trajectory.

Figure 6:
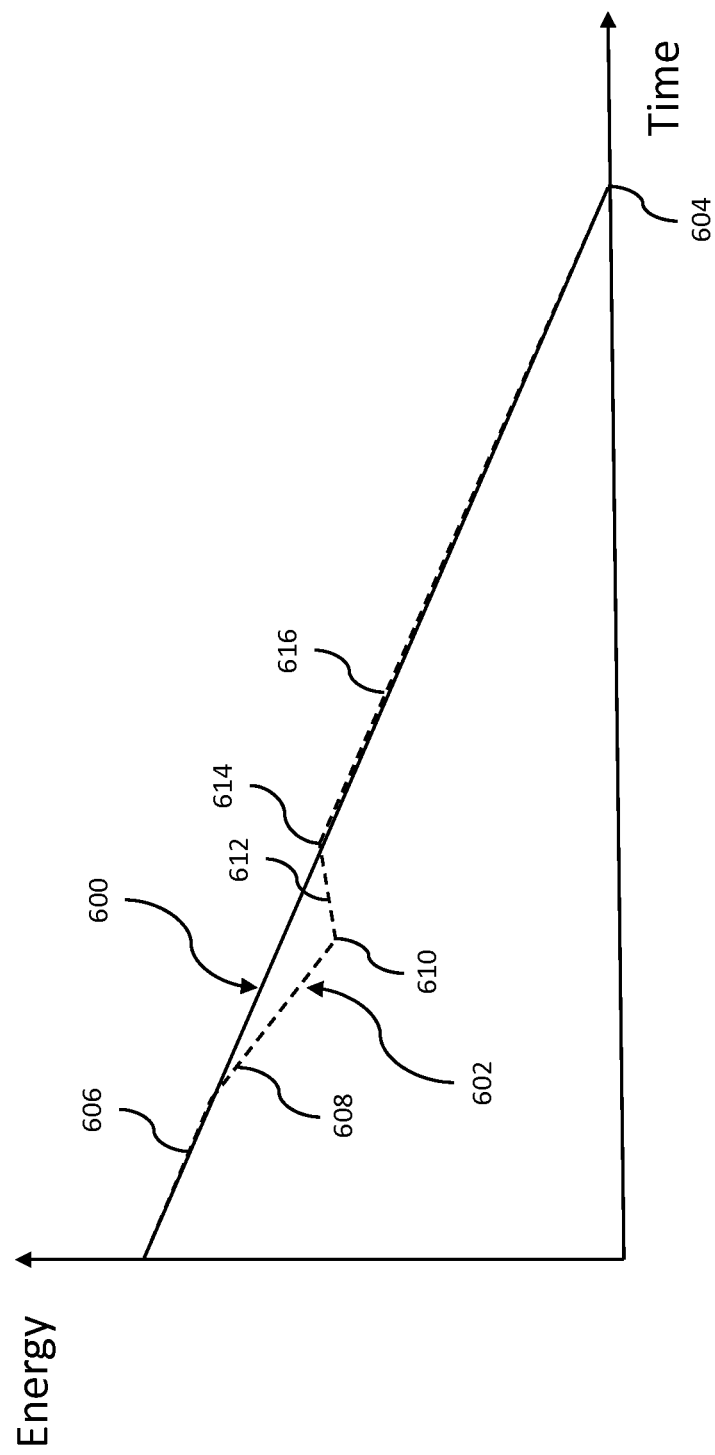
FIG. 6 is a graph of stored energy of a vehicle energy storage device over time.

FIG. 6 depicts an example desired SOC trajectory 600 and an example actual SOC value 602 over time. As shown, desired SOC trajectory 600 was determined such that at the end of the time period (time 604), the energy stored in energy storage device 114 is essentially zero. In the example shown, actual SOC value 602 is essentially the same as desired SOC trajectory 600 during a first segment 606. During a second segment 608, actual SOC value 602 falls below desired SOC trajectory 600. At point 610, controller 118 determines that actual SOC value 602 is below desired SOC trajectory 600 (step 504 of FIG. 5), and starts engine 108 (step 506 of FIG. 5). As shown, during a third segment 612 actual SOC value increases as a result of engine 108 operating to generate additional energy for storage in energy storage device 114. At point 614, controller 118 determines that actual SOC value 602 has exceeded desired SOC trajectory 600 (step 508 of FIG. 5), and stops engine 108 (step 510 of FIG. 5). Finally, during a fourth segment 616 actual SOC value 602 tracks desired SOC trajectory 600 until it essentially reaches a zero energy level at time 604.

By employing method 500 in the manner described, controller 118 may be used to maintain the SOC of energy storage device 114 at some predefined level, defined by a chosen optimization technique for a given drive cycle. Method 500 can ensure that a reserve of useful energy is always present in energy storage device 114 throughout the predetermined driving time period. This can be useful in drive cycles where the load can temporarily exceed the capabilities of either engine 108 or the motor powered by energy storage device 114 acting alone (e.g., when vehicle 102 climbs a steep hill). If the system were permitted to deplete energy storage device 114, then such load variations could leave vehicle 102 underpowered. Additionally, method 500 may minimize unnecessary usage of engine power above the predefined level.

Figure 7:
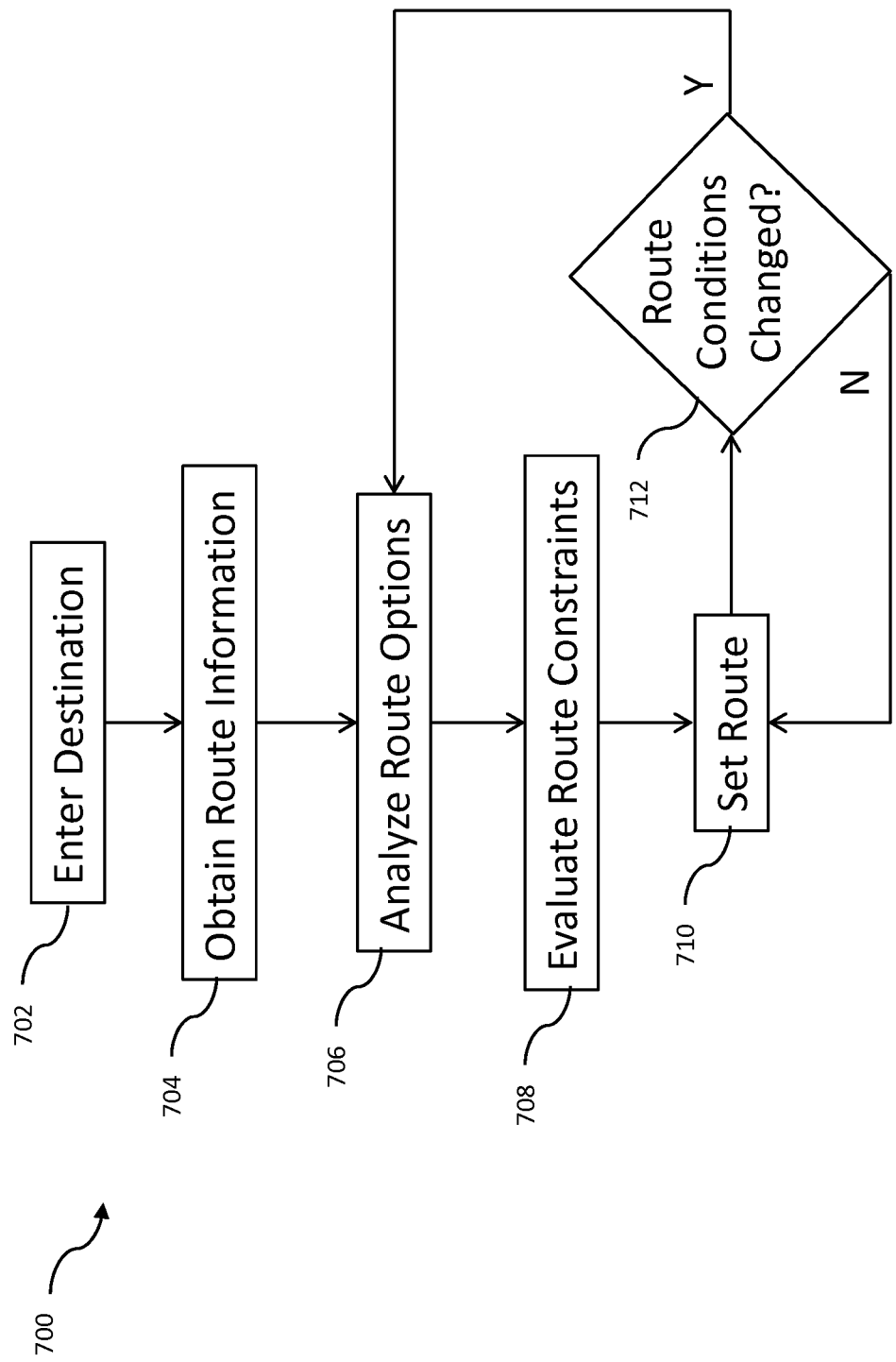
FIG. 7 is flow chart of a fifth method of controlling start/stop operation of an engine.

Referring now to FIG. 7, yet another embodiment of controlling engine start/stop operation is depicted. Method 700 may be performed by controller 108 executing the route optimization module that sets and adjusts a proposed route to a destination that will result in reduced engine usage and increased fuel efficiency. This embodiment provides a system that suggests an optimized route to a driver to maximize the number of engine stops that are of sufficient duration to provide the benefits associated with engine shutdown (i.e., fuel economy and emissions reduction) and that are spaced apart from one another sufficiently in time to facilitate recharging of energy storage device 114 between each stop (hereinafter referred to as "beneficial engine stops"). It should be understood that method 700 does not require use of a hybrid powertrain, but rather may be implemented using an internal combustion engine equipped with start-stop capabilities.

At step 702, the vehicle operator enters a desired destination via any one of a variety of conventional technologies for evaluation by controller 118. Using the current location of the vehicle (as determined by GPS or other means) and the desired destination, controller 118 accesses at step 704 other information for potential routes between the two locations, such as current traffic information, number of stop lights and stop signs, historical data, etc. At step 706, controller 118 evaluates the various route options to estimate the number of beneficial engine stops associated with each option.

In certain embodiments, the operator and/or fleet owner may enter constraints on the various potential options as indicated by step 708. It should be understood that step 708 may also precede step 706 in method 700. The various constraints of step 708 may include a drive time limitation, wherein the owner requires that the selected route option take no more than a specified amount of time longer than the fastest route. Alternatively, the owner may require that the selected route be no more than a specified percentage longer than the fastest route. The constraints may further include a requirement to minimize the number of left turns (to enhance safety), a requirement to avoid certain roads, etc.

At step 708, controller 118 sets the final route as the route option that meets the constraints of step 708 and provides the most beneficial engine stops that will result in improved fuel economy such as by including more of the following characteristics: longer stop opportunities, which means engine 108 can be shut down for a longer period of time at each stop, and stop opportunities that are spaced out (in distance and/or in time) to facilitate the energy storage device 114 recharging opportunities between each stop opportunity.

At step 712, controller 118 monitors the conditions associated with the final route by obtaining traffic information, etc. from any of a variety of sources. If the route conditions have not changed in a manner that requires a reassessment of the selected route, then controller 118 continues this monitoring. If route conditions have changed such that a reassessment of the final route is required or may be desirable, method 700 returns to step 706 as indicated in FIG. 7. The remainder of the trip may then follow an alternative route.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of controlling start/stop operation of an engine of a hybrid vehicle, comprising:
   sensing an ambient temperature of an environment of the engine;
   evaluating, using a controller, a model specific to physical characteristics of the engine using the sensed ambient temperature; and
   setting a restart frequency and duration of the engine in response to evaluating the model, the restart frequency and duration being set such that the engine is started at a frequency and operated for a duration after each start that avoids excessive cool down of the engine,
   wherein the physical characteristics of the engine include at least one of engine size, engine materials, and engine location on the hybrid vehicle.

2. The method of claim 1, wherein sensing the ambient temperature of the environment of the engine comprises receiving a temperature signal from a temperature sensor.

3. The method of claim 1, wherein sensing the ambient temperature of the environment of the engine comprises receiving a temperature signal over a communication network from a remote source.

4. The method of claim 1 further comprising adjusting the restart frequency and duration of the engine in response to a variation in the ambient temperature.

5. The method of claim 1, wherein the model includes information indicative of how often to restart the engine and how long to run the engine during each restart to prevent the engine from excessive cool down.

6. The method of claim 1, wherein the restart frequency and duration are a time-based restart frequency and duration.

7. The method of claim 6, wherein the time-based restart frequency and duration are a fixed-time restart frequency and duration.

8. The method of claim 1, wherein the controller is configured to monitor the ambient temperature over a period of time and to adjust the restart frequency and duration in response to variations in the ambient temperature.

9. The method of claim 1, wherein the ambient temperature is derived from temperature indicative information from a temperature sensor mounted on the hybrid vehicle or derived from temperature indicative information from over a communication network from a source remote from the hybrid vehicle.

10. A method of controlling start/stop operation of an engine of a hybrid vehicle, comprising:
    sensing an ambient temperature of an environment of the engine;
    evaluating, using a controller, a model for the engine using the sensed ambient temperature; and
    setting, using the controller, a time-based restart frequency and duration of the engine in response to evaluating the model, the time-based restart frequency and duration being set such that the engine is started at a frequency and operated for a duration after each start that avoids excessive cool down of the engine,
wherein the model includes information indicative of how often to restart the engine and how long to run the engine during each restart to prevent the engine from excessive cool down.

11. The method of claim 10, wherein sensing the ambient temperature of the environment of the engine comprises receiving a temperature signal from a temperature sensor or receiving a temperature signal over a communication network from a remote source.

12. The method of claim 10 further comprising adjusting the time-based restart frequency and duration of the engine in response to a variation in the ambient temperature.

13. The method of claim 10, wherein the time-based restart frequency and duration is a fixed-time restart frequency and duration.

14. The method of claim 10, further comprising monitoring, using the controller, the ambient temperature over a period of time and to adjust the time-based restart frequency and duration in response to variations in the ambient temperature.

15. The method of claim 10, wherein the ambient temperature is derived from temperature indicative information from a temperature sensor mounted on the hybrid vehicle or from over a communication network from a source remote from the hybrid vehicle.

16. An engine start/stop operation system for a hybrid vehicle, the system comprising:
an ambient temperature sensor configured to sense an ambient temperature of an environment of the engine;
a controller configured to:
evaluate a model for the engine using the sensed ambient temperature; and
set a time-based restart frequency and duration of the engine in response to evaluating the model, the time-based restart frequency and duration being set such that the engine is started at a frequency and operated for a duration after each start that avoids excessive cool down of the wherein the model includes information indicative of how often to restart the engine and how long to run the engine during each restart to prevent the engine from excessive cool down.

17. The system of claim 16, wherein the controller is configured to monitor the ambient temperature over a period of time and to adjust the time-based restart frequency and duration in response to variations in the ambient temperature.

18. The system of claim 16, wherein the ambient temperature is derived from temperature indicative information from a temperature sensor mounted on the hybrid vehicle or from over a communication network from a source remote from the hybrid vehicle.

* * * * *